(12) United States Patent
Tyagi et al.

(10) Patent No.: US 12,040,635 B2
(45) Date of Patent: Jul. 16, 2024

(54) SYSTEM AND METHOD FOR DYNAMICALLY BALANCING POWER FROM DISTRIBUTED POWER SOURCES IN A BATTERY PACK

(71) Applicant: IgrenEnergi, Inc., Mountain View, CA (US)

(72) Inventors: Sunit Tyagi, Bangalore (IN); Hemanshu Bhatt, Mumbai (IN); Jitendra Apte, Mumbai (IN); Anupam Hudait, Mumbai (IN); Ranjith Nandakumar, Bangalore (IN); Santhosha Gowda, Bangalore (IN); Deepthi Keshavan, Bangalore (IN); Pooja Sharma, Mumbai (IN)

(73) Assignee: IGRENENERGI, INC., Mountain View, CA (US)

( * ) Notice: Subject to any disclaimer, the term of this patent is extended or adjusted under 35 U.S.C. 154(b) by 426 days.

(21) Appl. No.: 17/396,461

(22) Filed: Aug. 6, 2021

(65) Prior Publication Data
US 2023/0049245 A1 Feb. 16, 2023

(51) Int. Cl.
H02J 7/00 (2006.01)

(52) U.S. Cl.
CPC ........ H02J 7/0016 (2013.01); H02J 7/00034 (2020.01); H02J 7/0029 (2013.01);
(Continued)

(58) Field of Classification Search
CPC .... H02J 7/0016; H02J 7/00034; H02J 7/0029; H02J 7/00302; H02J 7/0048; H02J 7/00714; H02J 7/007182; H02J 7/00306
(Continued)

(56) References Cited

U.S. PATENT DOCUMENTS

2011/0279079 A1    11/2011  Do Valle et al.
2012/0223677 A1*   9/2012   Yamauchi .............. H02J 7/34
                                                    320/134
(Continued)

FOREIGN PATENT DOCUMENTS

KR    20180037762 A    4/2018

OTHER PUBLICATIONS

ISA Korean Intellectual Property Office, International Search Report and Written Opinion Issued in Application No. PCT/US2022/074640, Nov. 30, 2022, WIPO, 9 pages.

*Primary Examiner* — Zixuan Zhou
(74) *Attorney, Agent, or Firm* — Alleman Hall & Tuttle LLP

(57) ABSTRACT

A battery management system for dynamically balancing power in a battery module is provided. The battery management system comprises a plurality of modules, and each of the plurality of modules comprises a plurality of bricks. Each of the plurality of bricks comprises a plurality of blocks, electrically connected in one of a series configuration or a parallel configuration and a controller assembly provided in each of the plurality of the modules. The controller assembly comprises a first converter adapted to be connected to the plurality of bricks and a second converter adapted to be connected to an external system. The controller assembly is configured to obtain a plurality of battery pack parameters from the plurality of bricks using the first converter, process the obtained plurality of battery pack parameters and determine a current level to regulate a charging or discharging of the battery pack using the second converter.

23 Claims, 12 Drawing Sheets

(52) U.S. Cl.
CPC ........ *H02J 7/00302* (2020.01); *H02J 7/0048* (2020.01); *H02J 7/00714* (2020.01); *H02J 7/007182* (2020.01); H02J 7/00306 (2020.01)

(58) Field of Classification Search
USPC .................................................. 320/116–119
See application file for complete search history.

(56) References Cited

U.S. PATENT DOCUMENTS

| | | |
|---|---|---|
| 2013/0278065 A1 | 10/2013 | Kawamoto et al. |
| 2014/0266069 A1* | 9/2014 | Deboy ................ H02J 7/00712 320/137 |
| 2016/0056657 A1* | 2/2016 | Hang .................... H02J 7/0068 320/128 |
| 2017/0271984 A1 | 9/2017 | Kohn et al. |
| 2020/0176830 A1 | 6/2020 | Huff et al. |

* cited by examiner

SYSTEM AND METHOD FOR DYNAMICALLY BALANCING POWER FROM DISTRIBUTED POWER SOURCES IN A BATTERY PACK

BACKGROUND

Technical Field

The embodiments of the present invention generally relate to battery management systems (BMS) and methods, and more particularly to battery management systems in vehicles, including systems and methods for dynamically balancing power from distributed power sources in a battery pack.

Description of the Related Art

Electric Vehicles and grid integration of renewables has precipitated large scale development and deployment of battery systems. The battery packs comprise battery modules/cells connected in series and parallel combinations to meet the voltage current requirements of the connected loads. The scale of the battery packs can range from hundreds to thousands of individual cells connected in series and parallel configurations, and Battery Management Systems (BMS) help to optimize the individual performance of each of a large number of cells to meet the power and energy requirement of the application.

Typically, proper functioning of the battery pack requires precise matching of the individual cells during manufacturing and minimization of mismatch between the cells. However, with continued use the cells start ageing non-uniformly and the cell mismatch increases, which can cause reduction in available capacity of the battery pack. Thus, BMS include balancing circuits that correct the mismatch between the cells.

The architecture of a BMS system and its complexity depend on the size of the battery pack and the various functions that the BMS is expected to provide during its operation. A hierarchical architecture of a BMS, where different circuit implementation for managing cells and groups of cells and configuring series and parallel connections to meet the voltage and current requirements at various levels, is very beneficial and also improves implementation and control. This can be done in multiple ways and defining the various levels and groups of cells that are managed and controlled by the BMS can provide many benefits without making the implementation complex and expensive.

The conventional BMS has a cluster of battery packs connected in series/parallel configurations to have higher energy density. FIG. 1 shows one such cluster example of conventional BMS architecture in series and parallel configurations. As shown in FIG. 1, each BMS 101A and 101N handles the mismatch between the cells/blocks connected to it by doing balancing between strong and weak cells/blocks (103A-N, 104A-N). In both series and parallel configurations, the BMS 101 removes the mismatch by various balancing techniques such as passive and active balancing.

However, the conventional BMS 101 according to FIG. 1 typically possesses two major drawbacks. The first is that when the packs are connected in series or parallel configuration and if there are cell blocks that have aged faster or have higher level of degradation, they will influence the available capacity of the pack they are connected to and therefore will dictate the behavior of the healthier packs and also degrade the healthier packs faster thereby reducing the life of cells/blocks within the healthy packs. The second drawback in a conventional BMS 101 is that a single charge/discharge controller is used for charging/discharging the packs. The controller hence processes high power through its circuit. This requires higher power rating components which can be expensive and further since the higher power is processed through the single circuit the losses are higher. This leads to reduced efficiencies and underutilization of the battery pack's energy during charging/discharging.

The BMS has to be designed in such a way that the module of the BMS charges/discharges the entire battery pack at its own rate and maximizes the power utilization of the battery packs with minimal losses using circuit transistors and inductors ratings tuned for performance and cost.

The battery management system can be designed hierarchically (as described in U.S. patent application Ser. No. 16/928,889), which comprises a plurality of modules 202A-N, a plurality of bricks 204A-N, a plurality of blocks 206A-N, a plurality of cells 208A-N and a battery pack 202 as shown in FIG. 2. In order to combine the power from a plurality of bricks 204A-N into the plurality of modules 202A-N, the circuit design of the clusters uses different circuits that allows the plurality of bricks 204A-N to be connected in series or parallel together and ensure easy coordination of functioning across modules 202A-N. Further, multiple modules can be connected in series or parallel configuration in a pack to meet the current and voltage requirements of the powertrain of the electric vehicle.

Accordingly, there remains a need for a battery management system and method for dynamically balancing power in a battery pack using hierarchical architecture during charging and discharging to alleviate the above described deficiencies in conventional systems.

The above information disclosed in this Background section is only for enhancement of understanding of the background of the present disclosure, and may contain information that does not form the prior art.

SUMMARY

In view of the foregoing, an embodiment herein provides a battery management system for dynamically balancing power in a battery pack using hierarchical architecture during charging and discharging of the battery pack. The battery management system comprises a plurality of modules and each of the plurality of modules comprises a plurality of bricks. Each of the plurality of bricks comprises a plurality of blocks that are electrically connected in at least one of a series configuration or a parallel configuration and a controller assembly provided in each of the plurality of modules. The controller assembly comprises a first converter adapted to be connected to the plurality of bricks and a second converter adapted to be connected to an external system. The controller assembly is configured to obtain a plurality of battery pack parameters from the plurality of bricks using the first converter, process the obtained plurality of battery pack parameters and determine a current level to regulate a charging or discharging of the battery pack using the second converter.

In some embodiments, the first converter and the second converter are configured to be connected in at least one of a series configuration or a parallel configuration.

In some embodiments, the plurality of battery pack parameters comprises one or more of a battery pack voltage and current measurements obtained from the plurality of bricks, and charging and discharging voltage and current measurements for the external system.

In some embodiments, the controller assembly is adapted to obtain the plurality of battery pack parameters from each of the plurality of bricks through an internal Controller Area Network (CAN) connected to the brick and determine isolation of the battery pack from the external system in case of a fault condition based on the obtained plurality of battery pack parameters.

In some embodiments, each module of the plurality of modules connected in a series configuration or a parallel configuration is adapted to communicate with each other through an external CAN.

In some embodiments, the converter assembly comprises a bi-directional full-bridge converter.

In some embodiments, the controller assembly is adapted to operate in at least three discharge modes based on a battery pack voltage, where the three discharge modes comprise of a boost discharge mode, a buck discharge mode and a bypass mode.

In some embodiments, the controller assembly operates in the boost discharge mode if the battery pack voltage is below a threshold load voltage.

In some embodiments, the controller assembly operates in the buck discharge mode if the battery pack voltage is above the threshold load voltage.

In some embodiments, the controller assembly operates in the bypass discharge mode if the battery pack voltage is equal to the threshold load voltage.

In some embodiments, the controller assembly is adapted to operate in at least two charge modes based on a battery pack voltage, wherein the at least two charge mode comprises a buck constant current mode and a buck constant voltage mode.

In some embodiments, the controller module is adapted to operate in the buck constant current mode if the battery pack voltage is less than a threshold voltage, where a reference current is set to a required charging rate and comparing the reference current against a battery charging current.

In some embodiments, the controller module is adapted to operate in the buck constant voltage mode if the battery pack voltage exceeds a threshold voltage, where a reference voltage is set to a fully charged battery pack voltage and comparing the reference voltage against the battery pack voltage.

In one aspect, a method for dynamically balancing power in a battery module of a battery pack by regulating discharging and charging voltage and current levels in a battery pack is provided. The method comprises providing a battery pack comprising a plurality of modules, wherein each of the plurality of modules comprises a plurality of bricks, wherein each of the plurality of bricks comprises a plurality of blocks that are electrically connected in at least one of a series configuration or a parallel configuration; and providing a controller assembly in each of the plurality of the modules, the controller assembly comprising a first converter adapted to be connected to the plurality of bricks and a second converter adapted to be connected to an external system. The controller assembly is configured for obtaining a plurality of battery pack parameters from the plurality of bricks using the first converter, processing the obtained plurality of battery pack parameters and determining a current level to regulate a charging or discharging of the battery pack using the first converter.

In some embodiments, the first converter and the second converter are configured to be connected in at least one of a series configuration or a parallel configuration.

In some embodiments, the plurality of battery pack parameters comprises one or more of a battery pack voltage and current measurements obtained from the plurality of modules comprising a plurality of bricks; and charging and discharging voltage and current measurements for the external system.

In some embodiments, the plurality of battery pack parameters comprises one or more of a remaining charge (Ah) of the battery pack, which represents the amount of charge (Ah) remaining in the battery pack. This remaining charge is derived from a State of Charge (SOC) and is given as % fraction of capacity of the battery pack. Other battery pack parameters may include State of Health (SOH %) of a battery for the % reduced pack capacity due to use and age, where the remaining charge in the battery is then calculated as a product of % SOC, SOH and initial capacity, as follows: remaining charge (Ah)=SOC %*SOH %*original capacity (Ah). Remaining charge in the battery can be obtained from the plurality of modules, the plurality of bricks, and charging and discharging measurements of SOC, SOH of the modules in the system.

In some embodiments, the method further comprises obtaining, by the controller assembly, the plurality of battery pack parameters from each of the plurality of bricks through an internal Controller Area Network (CAN) connected to the brick, and determining isolation of the battery pack from the external system in case of a fault condition based on the obtained plurality of battery pack parameters.

In some embodiments, each module of the plurality of modules connected in a series configuration or a parallel configuration is adapted to communicate with each other through an external CAN. In some embodiments, the converter assembly comprises a bi-directional full-bridge converter.

In some embodiments, the method further comprises operating the controller assembly in at least three discharge modes based on a battery pack voltage, where the three discharge modes comprise a boost discharge mode, a buck discharge mode and a bypass mode.

In some embodiments, the method of operating the controller assembly in at least three discharge modes comprises (i) checking, if the obtained battery pack voltage is above the threshold load voltage or not, operating, the battery pack in a buck discharge mode, if the battery pack voltage is above the threshold load voltage, (ii) operating the battery pack in the boost discharge mode if the battery pack voltage is below the threshold load voltage; or (iii) operating the battery pack in the bypass discharge mode if the battery pack voltage is equal to the threshold load voltage.

In some embodiments, the method further comprises operating the controller assembly in at least two charge modes, wherein operating the controller assembly in at least two charge modes are based on a battery pack voltage. Here the at least two charge mode comprises a buck constant current mode and a buck constant voltage mode.

In some embodiments, the method of operating the controller assembly in the buck constant current mode comprises operating the controller assembly in the buck constant current mode if the battery pack voltage is less than a threshold voltage, where a reference current is set to a required charging rate and comparing the reference current against a battery charging current and operating the controller assembly in the buck constant voltage mode if the battery pack voltage exceeds a threshold voltage, where a reference voltage is set to a fully charged battery pack voltage and comparing the reference voltage against the battery pack voltage.

In some embodiments, the method to control the plurality of battery pack parameters further comprises measuring one or more brick battery parameters to determine the remaining charge (Ah) of the brick based on the calculation amount of charge (Ah) remaining in the plurality of bricks in the plurality of modules. Further the remaining charge capacity is derived for the bricks. State of Charge (SOC) is given as % fraction of capacity of the module bricks already charged, State of Health (SOH %) of the brick, accounts for % loss in brick capacity due to use and age, and remaining charge in the brick is then calculated as a product of % SOC, SOH and initial capacity.

$$\text{remaining charge in brick (Ah)} = \text{SOC \%} * \text{SOH \%} * \text{initial capacity (Ah)}.$$

The remaining charge in brick is obtained from the measurements of the plurality of bricks % SOC, % SOH of the batteries in the system, and these plurality of charges are summed to define a charge in the battery pack.

During charging the relevant measurement is the remaining charging capacity=(battery capacity−charge in brick)= (SOH %*initial brick capacity)*(100−SOC %).

In some embodiments, the method to control the plurality of battery packs is such that the mismatch between the plurality of battery modules in charge in battery is removed during the complete discharging or charging cycle.

In some embodiments, the method to control current during discharging through the plurality of battery bricks further comprises calculating the currents by looking at the charge in bricks for the plurality of module bricks and balancing these by discharging differently. The discharging current of the plurality of bricks is chosen in proportion to the remaining charge in the said brick. As an example, battery pack 1 with charge in brick A discharges with current a, and battery pack 2 with charge in brick B discharges with current b, such that a proportion of currents a and b is equal to the proportion of charges A and B, so that A:B::a:b.

In some embodiments, the method to control currents during charging through the plurality of battery bricks further comprises calculating currents by looking at the balance of remaining charging capacity in bricks between the plurality of module bricks. The charging current of each of the plurality of battery bricks is chosen in proportion to the remaining charging capacity of the said battery brick. So battery brick 1 with remaining charging capacity C charges with current c, and battery brick 2 with remaining charging capacity D discharges with current d, such that proportion of currents c and d is equal to the proportion of remaining charging capacity C and D, so that C:D::c:d.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Accordingly, the embodiments herein disclose example battery management system architectures and designs, comprising a brick BMS controller that does dynamic balancing (of the brick) at the block level to address the issues of cell mismatch and the module BMS controller that does dynamic balancing (of the battery pack) at the brick level and provides the control and balancing at battery pack level by charging/discharging at each battery pack's own rate. Thus, the embodiments disclosed herein describe a battery management system and method to provide for dynamic balancing of the modules during charging and discharging of the battery pack.

Figure 1:
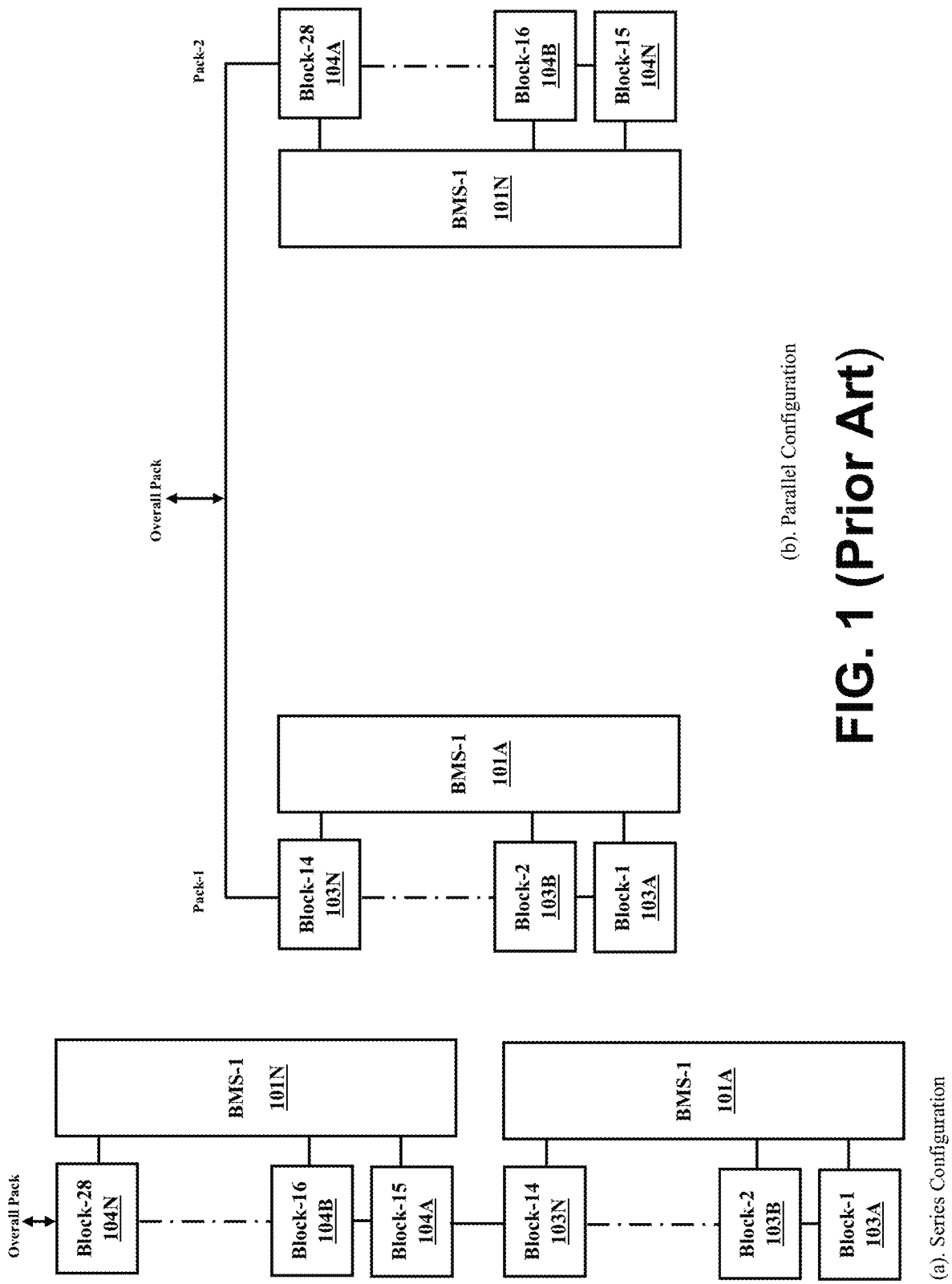
FIG. 1 is a high-level architecture diagram of a Battery Management System (BMS), according to a prior art illustration.
Figure 2:
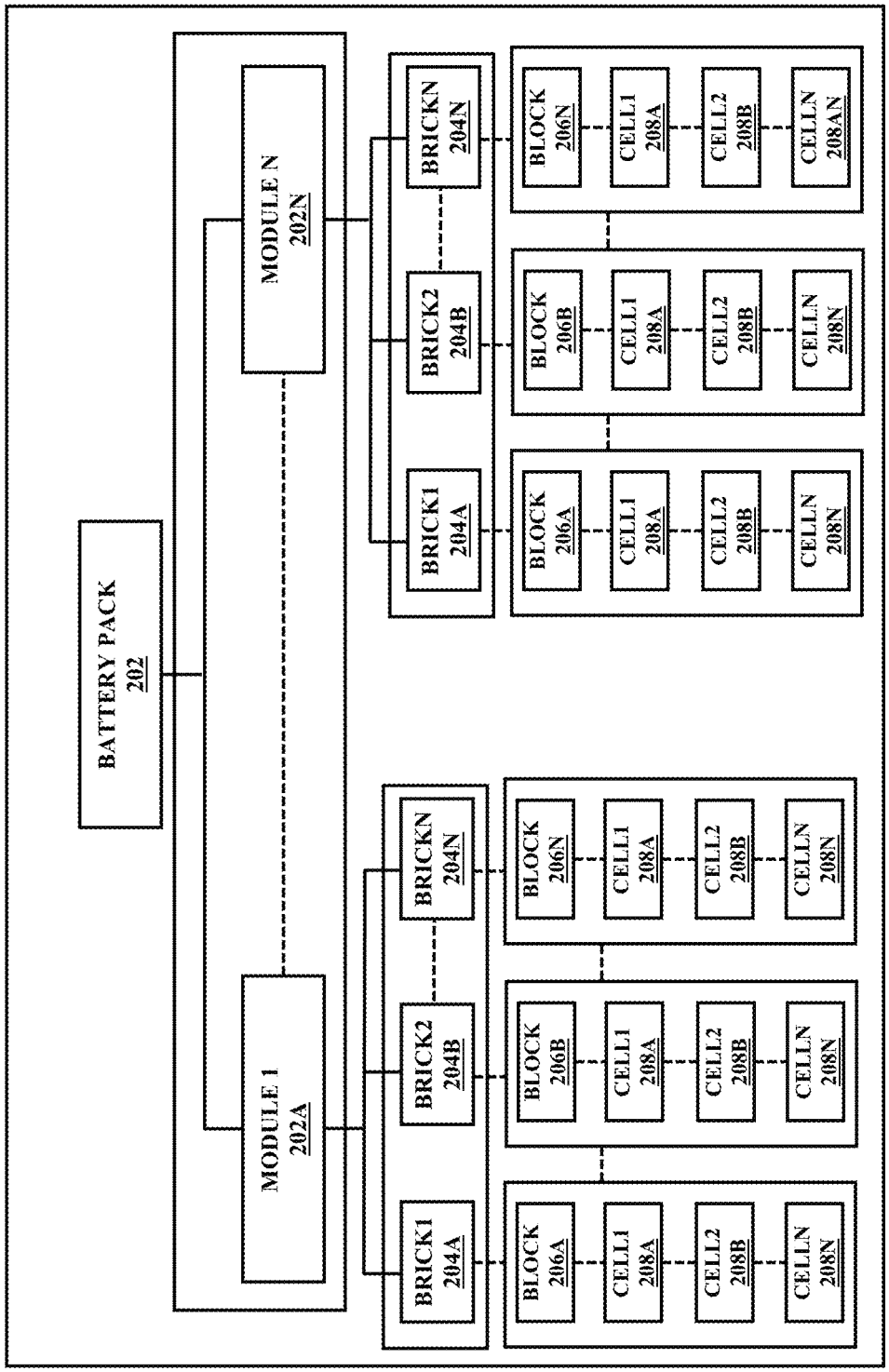
FIG. 2 illustrates a block diagram of a hierarchical architecture of a battery management system, according to a prior art illustration.
Figure 3:
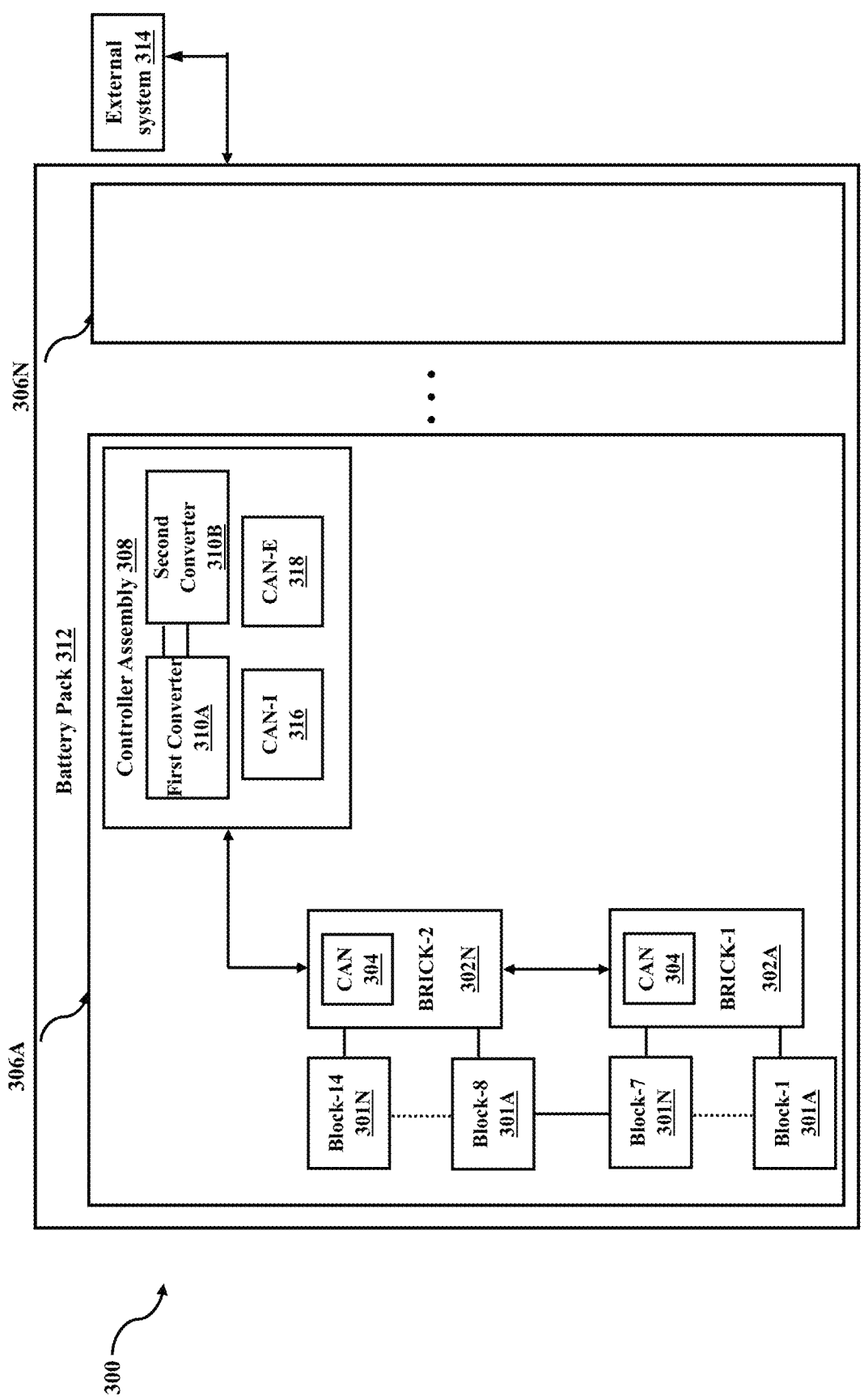
FIG. 3 is a block diagram of an example system for dynamically balancing power from distributed power sources in a battery pack, according to some embodiments herein.

FIG. 3 is a block diagram illustrating a battery management system 300 for dynamically balancing power from distributed power sources in a battery pack, according to some embodiments herein. The battery management system 300 comprises a battery pack 312 including a plurality of modules 306A-306N (the details of one of which 306A are shown), each module comprising a controller assembly 308. Each of the plurality of modules 306A-306N comprises a plurality of bricks 302A-302N that can be connected to each module 306A-306N. Each of the plurality of bricks 302A-302N comprises a plurality of blocks 301A-301N, that are electrically connected in at least one of a series configuration or a parallel configuration (this figure only shows a series configuration). The controller assembly 308 comprises a first converter 310A connected to the plurality of bricks 302A-302N and a second converter 310B connected to an external system 314. The controller assembly 308 is configured to obtain a plurality of battery pack parameters from the plurality of bricks 302A-302N using the first converter 310A, process the obtained plurality of battery pack parameters and determine a current level to regulate a charging or discharging of a battery pack 312 using the second converter 310B.

The first converter 310A and the second converter 310B work independently to regulate charging and discharging of the battery pack 312. The first converter 310A is connected towards plurality of bricks 302A-302N that do cell/block balancing and the second converter 310B is connected to the external system 314 and keeps the battery pack 312 isolated as shown in FIG. 3. The first converter 310A and the second converter 312B herein form a bi-directional full bridge converter that provides isolation between the battery pack 312 and the external system 314. This in turn does not initiate the need for a separate isolation circuit and hence no isolation transformer is required. Here each module of the plurality of modules 306A-306N connected in a series configuration or a parallel configuration is adapted to communicate with each other through an external CAN-E 318.

The controller assembly 308 is further adapted to obtain the plurality of battery module parameters from each of the plurality of bricks 302A-302N through an internal Controller Area Network (CAN-I) 316 connected to the plurality of bricks 302A-302N and determine isolation of the battery pack 312 from the external system 314 in case of a fault condition based on the obtained plurality of battery pack parameters. The plurality of battery module parameters herein comprises at least one of, but not limited to, battery module voltage and current measurements obtained from the plurality of bricks 302A-302N, and charging and discharging voltage and current measurements for the external system 314.

The controller assembly 308 is further adapted to operate in at least three discharge modes based on a battery module voltage. The three discharge modes comprise of a boost discharge mode, a buck discharge mode and a bypass mode. The controller assembly 308 operates in the boost discharge mode if the battery pack voltage is below a threshold load voltage. The controller assembly 308 operates in the buck discharge mode if the battery pack voltage is above the threshold load voltage. The controller assembly 308 operates in the bypass discharge mode if the battery pack voltage is equal to the threshold load voltage.

Furthermore, the controller assembly 308 is adapted to operate in at least two charge modes based on a battery pack voltage. The two charge modes comprise, but are not limited to, a buck constant current mode and a buck constant voltage mode. The controller assembly 308 is adapted to operate in the buck constant current mode if the battery pack voltage is less than a threshold voltage. The reference current is set to a required charging rate and the reference current is compared against a battery charging current. Further, the controller assembly 308 is adapted to operate in the buck constant voltage mode if the battery pack voltage exceeds a threshold voltage, where a reference voltage is set to a fully charged battery pack voltage and the reference voltage is compared against the battery pack voltage.

The controller assembly 308 monitors the battery pack voltage, current parameters and external system voltage, current parameters. This data is then processed by the control algorithm of the controller assembly 308 to determine the battery pack 312 charging and discharging levels.

Figure 4A:
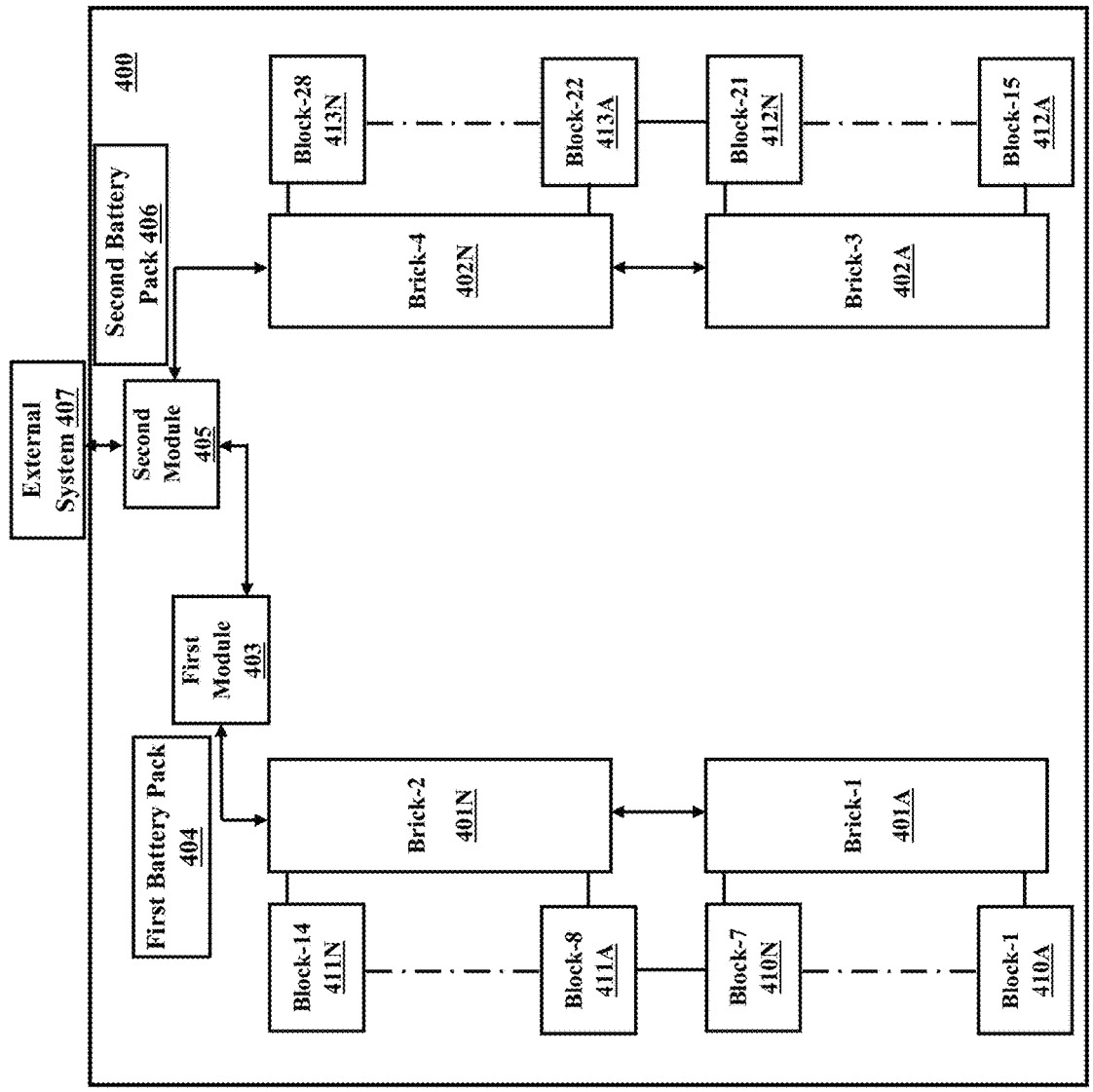
FIG. 4A illustrates an example battery pack power processing system connected in a series configuration according to some embodiments herein.

FIG. 4A illustrates a battery pack power processing system 400 connected in a series configuration according to some embodiments herein. As shown in FIG. 4A, a first module 403 and a second module 405 are connected in the series configuration. Bricks 1 and 2 are within first module 403, and bricks 3 and 4 are within second module 405 of first battery pack 404. The system 400 also can include additional battery packs, such as second battery pack 406. The controller assembly described previously (at 308 in FIG. 3) in the first module 403 monitors the voltage of a first battery pack 404 and the voltage and current levels from connected bricks 401A and 401N and the battery management system charging/discharging voltage and current. The brick 401A comprises a plurality of blocks 410A-410N. The brick 401N comprises a plurality of blocks 411A-411N. Similarly, the controller assembly in the second module 405 monitors the voltage of a second battery pack 406 and the voltage and currents level from connected bricks 402A-402N and the battery management system charging/discharging voltage and current. The brick 402A comprises a plurality of blocks 412A-412N. The brick 402N comprises a plurality of blocks 413A-413N. Based on the monitored voltage and current parameters, the battery pack current is modified by changing its charging/discharging levels and gives complete and fine-grained control.

The series configuration of the circuit implementation enables the isolation of the battery pack to be easier, efficient, and economical compared to other configurations. As one or more converters (not shown) in the first module 403 and the second module 405 are connected in series configuration, the power processed at each module level is lower and hence the losses are minimal compared to other configurations. These features provide for implementation of the controller assembly enabling low energy loss and economical design for pack control, with flexibility to address module level mismatch.

Figure 4B:
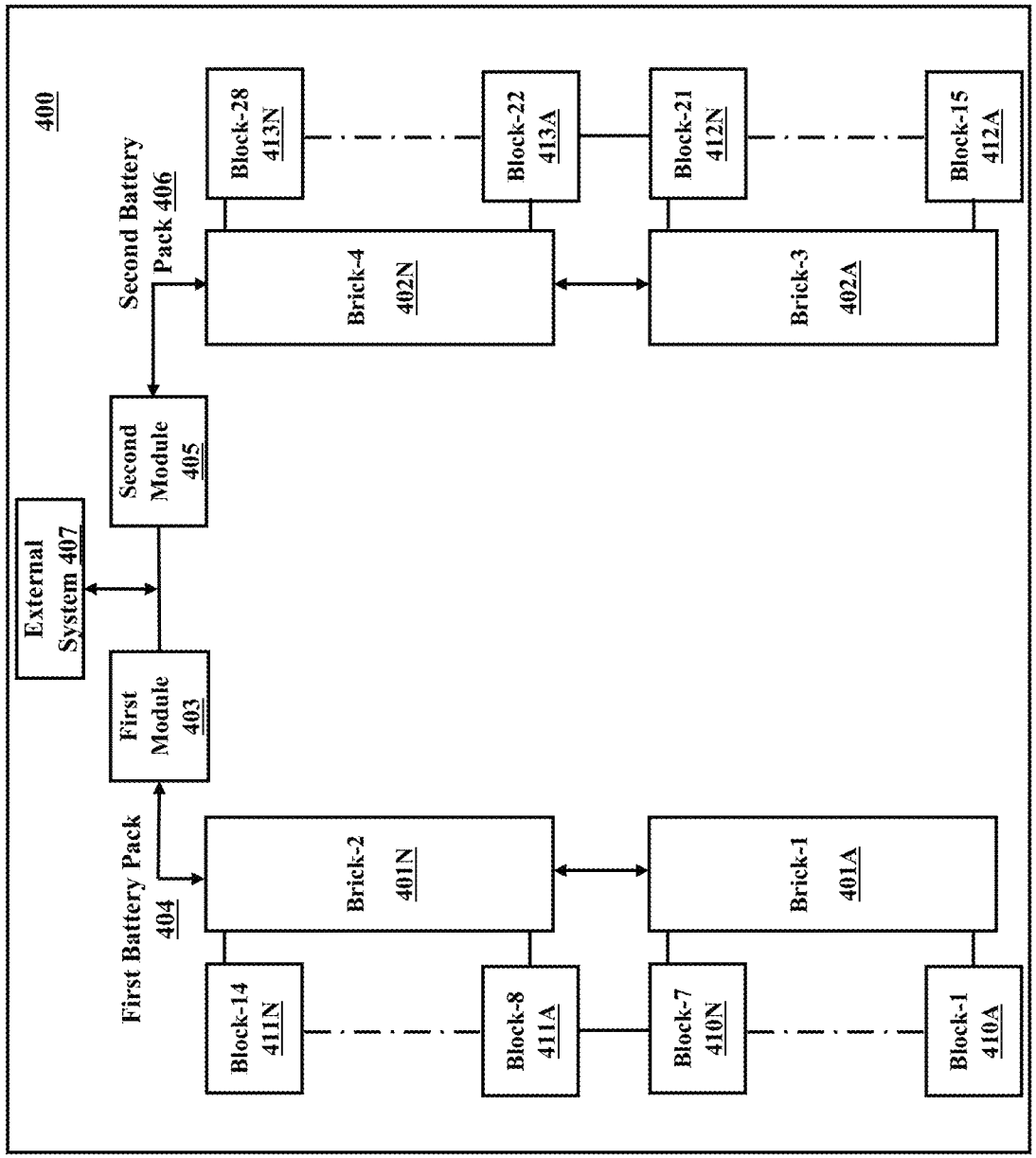
FIG. 4B illustrates an example battery pack power processing system connected in a parallel configuration according to some embodiments herein.

FIG. 4B illustrates a battery pack power processing system 400 connected in a parallel configuration according to some embodiments herein. As shown in FIG. 4B, the first module 403 and the second module 405 are connected in the parallel configuration.

The controller assembly described previously (not shown) in the first module 403 monitors the voltage of a first battery pack 404 and the voltage and current levels from connected bricks 401A and 401N and the battery management system charging/discharging voltage and current. The brick 401A comprises a plurality of blocks 410A-410N. The brick 401N comprises a plurality of blocks 411A-411N. Similarly, the controller assembly (not shown) in the second module 405 monitors the voltage of the second battery pack 406 and the voltage and currents level from the connected bricks 402A-402N and the system charging/discharging voltage and current. The brick 402A comprises a plurality of blocks 412A-412N. The brick 402N comprises a plurality of blocks 413A-413N. Based on the monitored voltage and current parameters, the battery pack current is modified by changing its charging/discharging levels and gives complete and fine-grained control.

The parallel configuration of the circuit implementation enables the isolation of the battery pack. The parallel configuration of the plurality of modules provides for higher power scalability to achieve higher energy density of battery pack, especially in electric vehicles compared to other configurations.

Figure 5:
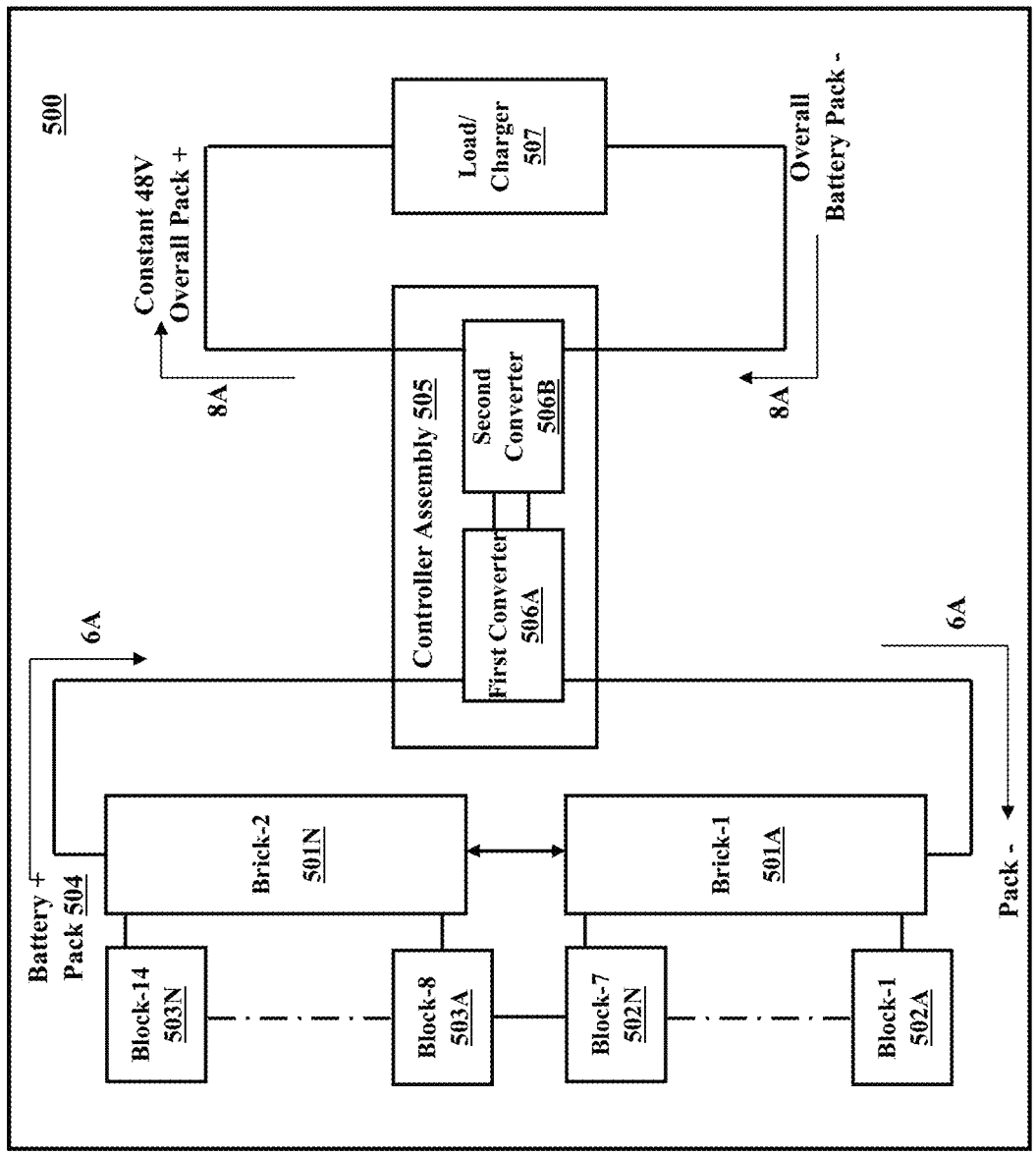
FIG. 5 is a schematic diagram illustrating an example discharge mode of a battery pack power processing system, according to some embodiments herein.

FIG. 5 is a schematic diagram illustrating the discharge mode of a battery pack power processing system 500, according to an example embodiment herein. As illustrated in FIG. 5, a battery pack 504 current requirement is only 6 A based on the voltage of the battery pack and for a load demand of 8 A at 48V. The load demand is determined by the controller assembly's algorithm, and based on the determined load requirement, a controller assembly 505 instructs to draw only 6 A based on the monitored voltage and current parameters. The controller assembly 505 includes a first converter 506A and a second converter 506B. The second converter 506B is connected to a load/charger 507. Further, the controller assembly 505 communicates through its internal CAN to a plurality of bricks 501A-501N and uses the brick data to make decisions such as battery pack isolation from the external system in-case of any faults. The plurality of bricks 501A-501N includes a plurality of blocks 502A-502N, 503A-503N.

Figure 6:
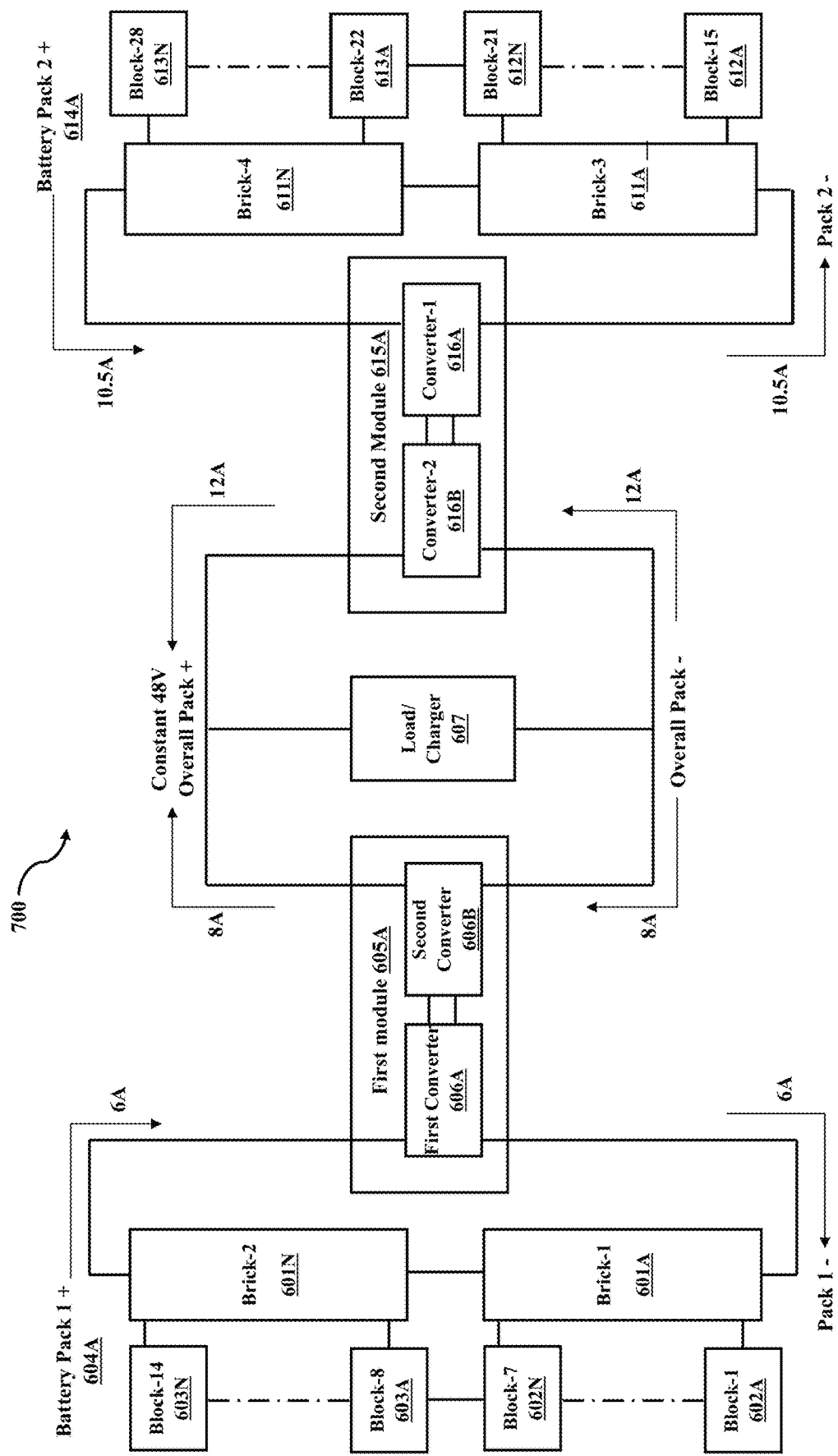
FIG. 6 is a block diagram illustrating an example discharge mode of a battery pack power processing system connected in a parallel configuration, according to some embodiments herein.

FIG. 6 is a block diagram illustrating the discharge mode of a battery pack power processing system connected in a parallel configuration, according to some embodiments herein. As shown in FIG. 6, a first module 605A of a battery pack 604A and the second module 615A of a battery pack 614A is connected in a parallel configuration. The first module 605A includes a first converter 606A and a second converter 606B. The second module 615A includes a first converter 616A and a second converter 616B. The second converter 606B of the first module 605A and the second converter 616B of the second module 615A are connected to a load/charger 607. The first converter 606A of the first module 605A is connected to a plurality of bricks 601A-601N comprising a plurality of blocks 602A-602N, 603A-603N. The first converter 616A of the second module 615A is connected to a plurality of bricks 611A-611N comprising a plurality of blocks 612A-612N, 613A-613N. When the first module 605A and the second module 615A are connected in parallel configuration the first module's 605A external CAN communicates to the second module's 615A external CAN and enables exchange of data with each other to assess and make decisions. From the data, each module smartly determines the current requirement to be discharged/charged from its connected battery pack. As can be seen from this illustrative example, based on the available capacities of the first module 605A as determined from the voltage and current measurements of the plurality of bricks 601A-601N and the plurality of blocks 602A-602N to 603A-603N, the controller determines the discharge current of 6 ampere (A). Similarly, based on the available capacities of the second module 615A as determined from the voltage and current measurements of bricks 611A-611N and blocks 612A-612N to 613A-613N, the controller determines the discharge current of 10.5 ampere. The second converter 606B for the first module 605A and the second converter 616B of the second module 615A then determine the discharge current to be provided to the connected load, which, in this case, is 8 A from the first module 605A and 12 A for the second module 615A.

Figure 7:
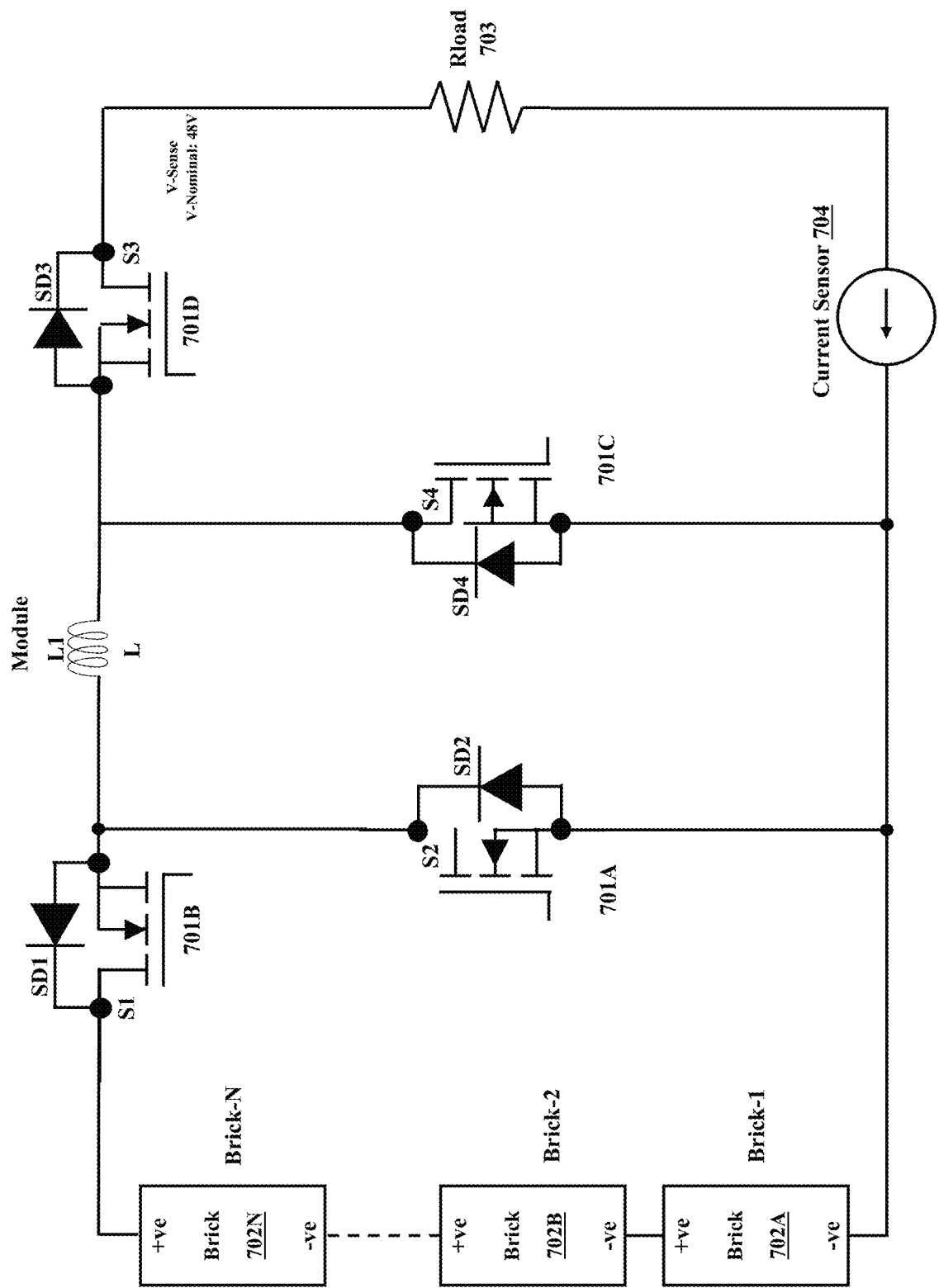
FIG. 7 illustrates a circuit schematic representation of an example battery pack power processing scheme in the battery management system, according to some embodiments herein.

FIG. 7 illustrates a schematic representation 700 of a module controller assembly circuit of the battery pack power processing scheme in the battery management system, according to some embodiments herein. The module controller assembly circuit comprises a plurality of MOSFET switches 701A-701D connected to the series connected bricks 702A-702N on one side and connected to load 703 on the other side with synchronized rectification at high frequency operations to reduce losses using soft switching methods. The controller assembly circuit according to FIG. 7 uses a bi-directional full bridge converter, which requires lesser number of power supplies along with better control and more economical than conventional charge/discharge controllers. The module controller assembly circuit is connected to a plurality of bricks 702A-702N and a current sensor 704.

The primary functionality of the module controller assembly is described below. In discharge mode is to maintain a constant load voltage of 48V (example) irrespective of the changes in the load. While in charging, it helps to ensure the battery is charged with the required rate of charging. The module controller assembly during the discharge mode operates in three distinct modes in discharge, for instance, a boost mode, a bypass mode and a buck mode. If the battery pack voltage is less than 47V, the module controller operates in boost mode. The bypass mode is enabled when the battery pack voltage is in the range of 47V to 49.5V. If the battery pack voltage exceeds 49.5V, the module controller operates in buck mode. In the buck and the boost mode, the load voltage is regulated to 48V whereas in the bypass mode, the load voltage will be equal to the battery pack voltage. The voltage of 48 V is used for reference only and can be higher or lower depending on the application.

To regulate the load voltage to exactly 48V in buck and boost mode in some examples, a PI (Proportional-Integral) control loop is used. Here, the reference voltage, Vref, is set to 48V and is compared to the battery pack voltage, Vbat, to produce an error € function as defined below.

$$€ = V\text{ref} - V\text{bat}$$

Further the change in duty cycle, ΔDC for the MOSFET switching is calculated, which is required to bring this error as close to zero as possible. This is given by:

$$\Delta DC = (Kp * €) + \text{Integral state};$$

where Kp represents the proportional gain of the PI controller; integral state is the previous value of integral state+ (Ki*€*Ts) and Ki represents the integral gain of the PI controller and Ts is the sampling time.

If the module controller is operating in the buck mode, the change in duty cycle, ΔDC, is added then to the present duty cycle of the buck discharge switch of the controller assembly, for instance MOSFET 701A, as shown in FIG. 7. Further, if the controller assembly is in boost mode, the differential current ΔDC is added to the present duty cycle of boost discharge switch of the controller, for instance, MOSFET 701C to achieve the required voltage regulation.

According to an embodiment, the controller assembly is adapted to operate in two distinct modes during charging, the Buck Constant Current (CC) mode and the Buck Constant Voltage (CV) mode. The charger voltage in some examples is set to 62V. If the battery pack voltage is less than 58.8V (corresponding to 4.2V per cell), the controller assembly will operate in the buck CC mode and if the battery pack voltage exceeds the full voltage of 58.8 V, the controller assembly is operated in buck CV mode. In other examples, any other suitable voltages can be used.

In the Buck CC mode, the objective is to maintain a constant charging current, as defined by the charging rate whereas in the Buck CV mode, the objective is to maintain the full voltage of the battery at 58.8V by slowly reducing the charging current. Here the current regulation in CC mode and voltage regulation in CV mode are achieved using Proportional-Integral (P) control loop.

In Buck CC mode, the reference current, Iref, is set to required charging C-rate and is compared to the battery charging current, Ibat, to produce an error € function. In Buck CV mode, the reference voltage, Vref, is set to fully charged battery pack voltage of 58.8V and is compared to the battery pack voltage, Vbat, to produce an error € function.

€Buck CC Mode=$I$ref−$I$bat; and

€Buck CV Mode=$V$ref−$V$bat

In both these modes, the change in duty cycle for the MOSFET switches 701A-701D as shown in FIG. 7, ΔDC is calculated, which is required to bring this error as close to 0 as possible. This is given by ΔDC=($Kp$*€)+Integral state where Kp represents the proportional gain of the PI controller and € represents €Buck CC Mode or €Buck CV Mode depending on the mode of charging.

Here, Integral state=Previous value of integral state+ (Ki*€*Ts); where Ki represents the integral gain of the PI controller and Ts is the sampling time.

Further, as the module controller assembly is operating in the buck mode, the change in duty cycle, ΔDC, is added to the present duty cycle of the Buck charging switch of the controller, MOSFET 701D, to achieve the required current and voltage regulation. The charging is said to be complete when the charging current trickles below a set threshold (0.2 A) in the CV mode.

As the module controller assemblies can be connected in parallel and series configurations, the power processed at each module level is lower and hence the losses are minimal. These features are all helpful for implementation of a module battery management controller assembly enabling lowest energy loss, most economical design for pack control, with flexibility to address module level mismatch.

Figure 8:
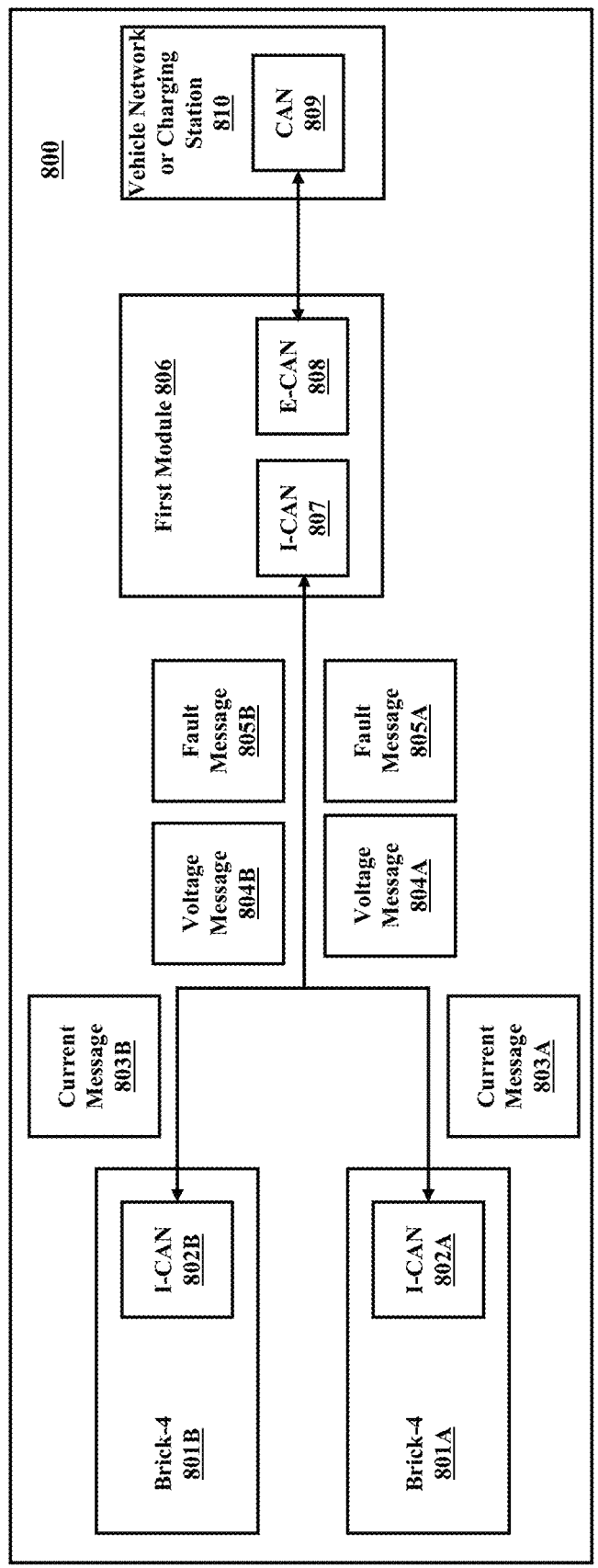
FIG. 8 illustrates a schematic representation of an example communication protocol of a battery pack power processing scheme in the battery management system, according to some embodiments herein.

FIG. 8 illustrates the schematic representation of a communication protocol 800 of the battery pack power processing scheme in the battery management system, according to some embodiments herein. The module controller supports CAN 2.0B extended framing protocol on both an Internal CAN 807 and an External CAN 808. The module controller comprises a first module 806. The Internal CAN 807 is built with a proprietary CAN messaging structure, whereas the external CAN 808 supports both proprietary and SAE J1939 messaging standards, for example. The external CAN 808 is connected to a CAN 809 of a vehicle network or charging station 810. The external CAN 808 is scalable and flexible to support other available and upcoming messaging standards. The data rates In some examples are up to 500 kbps, and potentially higher in other examples. The Internal CAN 807 is connected to an internal CAN (802A and 802B) of corresponding bricks (801A and 801B) and communicates message such as current message (803A and 803B), voltage message (804A and 804A) and fault message (805A and 805B) to the internal CAN (802A and 802B) of the bricks (801A and 801B). The module communication message transfers protocol to both internal CAN 807 and external CAN 808 as shown in FIG. 8.

According to an embodiment herein, the Internal CAN is designed to provide real time data transfer at milliseconds rate. Further the CAN design supports event-based triggering by bricks on fault occurrence for modules to execute protection schema. The CAN design also enables exchange of algorithm dependent data by bricks at timed instances to execute algorithm schema. The connected bricks communicate simultaneously with module at a very low wait period and response time that may range from 10 microsecond to 1 millisecond. The plug and start mechanism is achieved by connecting uniquely identified bricks to module.

The data sets are divided into proprietary groups with priority as shown in Table below:

| Priority | Group number | Group Name | Group message name |
|---|---|---|---|
| 1 | 1 | Critical Data | Fault flags indication |
|   |   |   | Status flags indication |
| 2 | 2 | Cell block data | Block Voltage |
|   |   |   | Block Current |
|   |   |   | Block State Of Charge |
|   |   |   | Block Temperature |
|   |   |   | Block Converter's Duty Cycle |
| 3 | 3 | Cell Brick Data | Brick Voltage |
|   |   |   | Brick Current |
| 4 | 4 | Cell Block and Brick Debug Data | Brick operating mode history |
|   |   |   | Block Instantaneous Balancing Current |
|   |   |   | Block Calculated Required Current for Charging or Discharging |
|   |   |   | Block Resistance |

Here group 1 is of highest priority and stores critical data such as faults and status indications. The group 2 stores the cell block data such as voltage, current, state of charge, duty cycle and temperature. The group 3 holds the brick data including the voltage and current and the group 4 is of lowest priority, which stores cell block debug data. The cell block debug data comprises instantaneous balancing current, required balancing current, brick operating modes history and resistance values. At timed intervals, messages are sent sequentially whereas for event-based messages the preference would be given to higher priority ones.

The following table illustrates data set division based on priority level for external communication.

| Priority | Group number | Group Name | Group message name |
|---|---|---|---|
| 1 | 1 | Pack Information | Pack Unique ID |
|   |   |   | Number of Brick connected |
|   |   |   | Number of modules connected |
|   |   |   | Module unique ID |
|   |   |   | Brick unique ID |
| 2 | 2 | Module Data | Fault flags indication |
|   |   |   | Status flags indications |
|   |   |   | Pack voltage |
|   |   |   | Pack current |

-continued

| Priority | Group number | Group Name | Group message name |
|---|---|---|---|
| 3 | 3 | Brick Data | Load or Source voltage<br>Load or Source current<br>Pack state of charge<br>Pack Temperature<br>Power Converter's Duty Cycle<br>Brick fault flags indication<br>Brick status flags indication<br>Block Voltage<br>Block Current<br>Block State Of Charge<br>Block Temperature<br>Block Converter's Duty Cycle<br>Brick Voltage<br>Brick Current<br>Brick operating mode history<br>Block Instantaneous Balancing Current<br>Block Calculated Required Current for Charging or Discharging<br>Block Resistance |

According to the embodiments herein, the CAN communication design is capable of Over the Air (OTA) parameter tuning and firmware upgrade. The battery specific, algorithm specific and hardware specific configurable parameters are stored into a built-in memory chip and read on every power on for runtime usage. These parameters whenever required to tune are done through Over the Air upgrades. Additionally, patch upgrades for built in firmware's are also executed Over the Air. The module controller provides CAN interfaces for such upgrades with success or failure responses.

Figure 9:
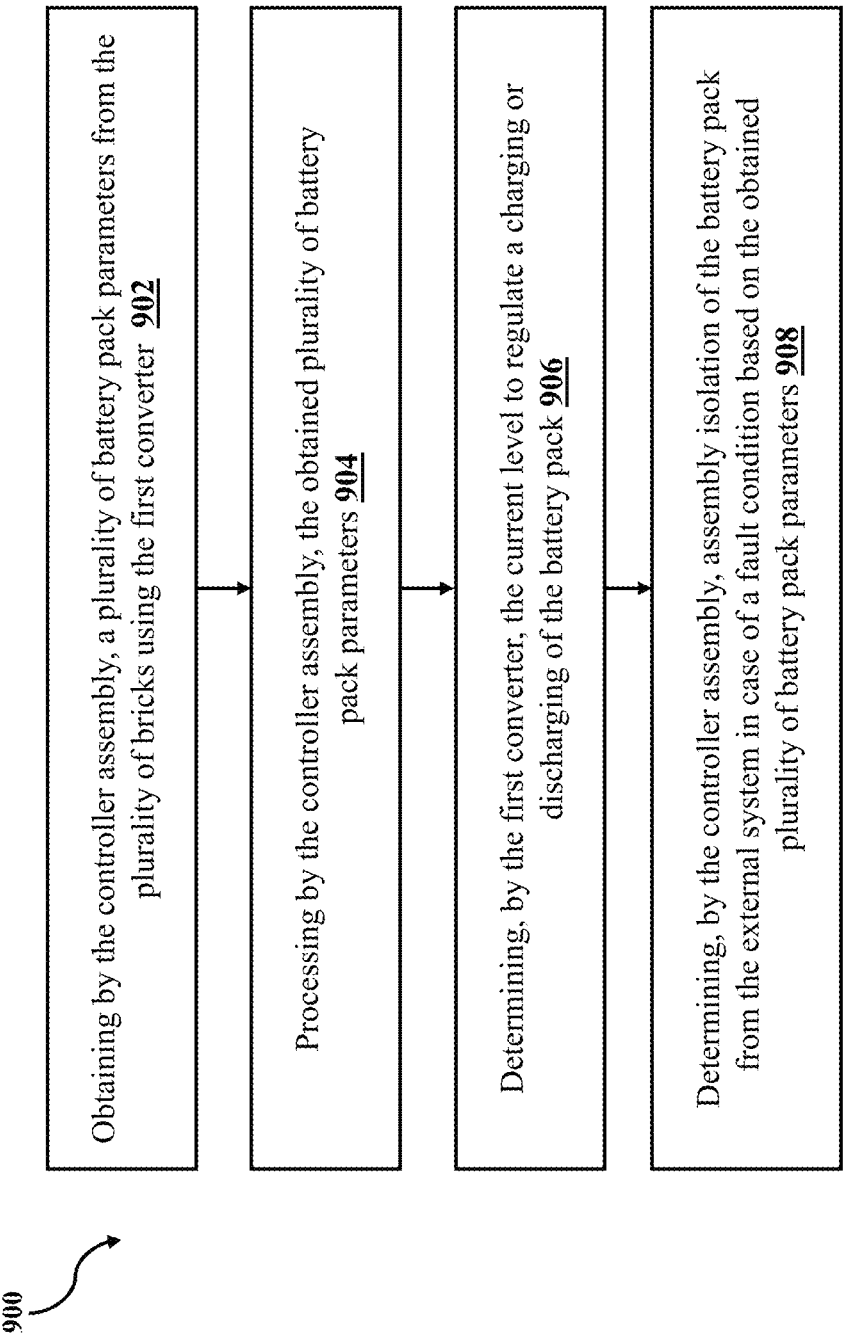
FIG. 9 is a flow diagram illustrating an example method for dynamically balancing power from distributed power sources in a battery pack, according to some embodiments herein.

FIG. 9 is a flow diagram illustrating an example method 900 for dynamically balancing power from distributed power sources in a battery pack, according to an embodiment herein. The method herein dynamically balance power in a battery module of a battery pack by regulating discharging and charging voltage and current levels in a battery pack. The battery pack comprising a plurality of modules and a controller assembly in each of the plurality of the modules. The controller assembly comprises a first converter adapted to be connected to the plurality of bricks and a second converter adapted to be connected to an external system. The method comprises, at step 902, obtaining by the controller assembly, a plurality of battery pack parameters from the plurality of bricks using the first converter. At step 904, the obtained plurality of battery pack parameters are processed by the controller assembly and at step 906, a current level to regulate a charging or discharging of the battery pack using the first converter is determined. Further, at step 908, the controller assembly determines isolation of the battery pack from the external system in case of a fault condition based on the obtained plurality of battery pack parameters.

Figure 10:
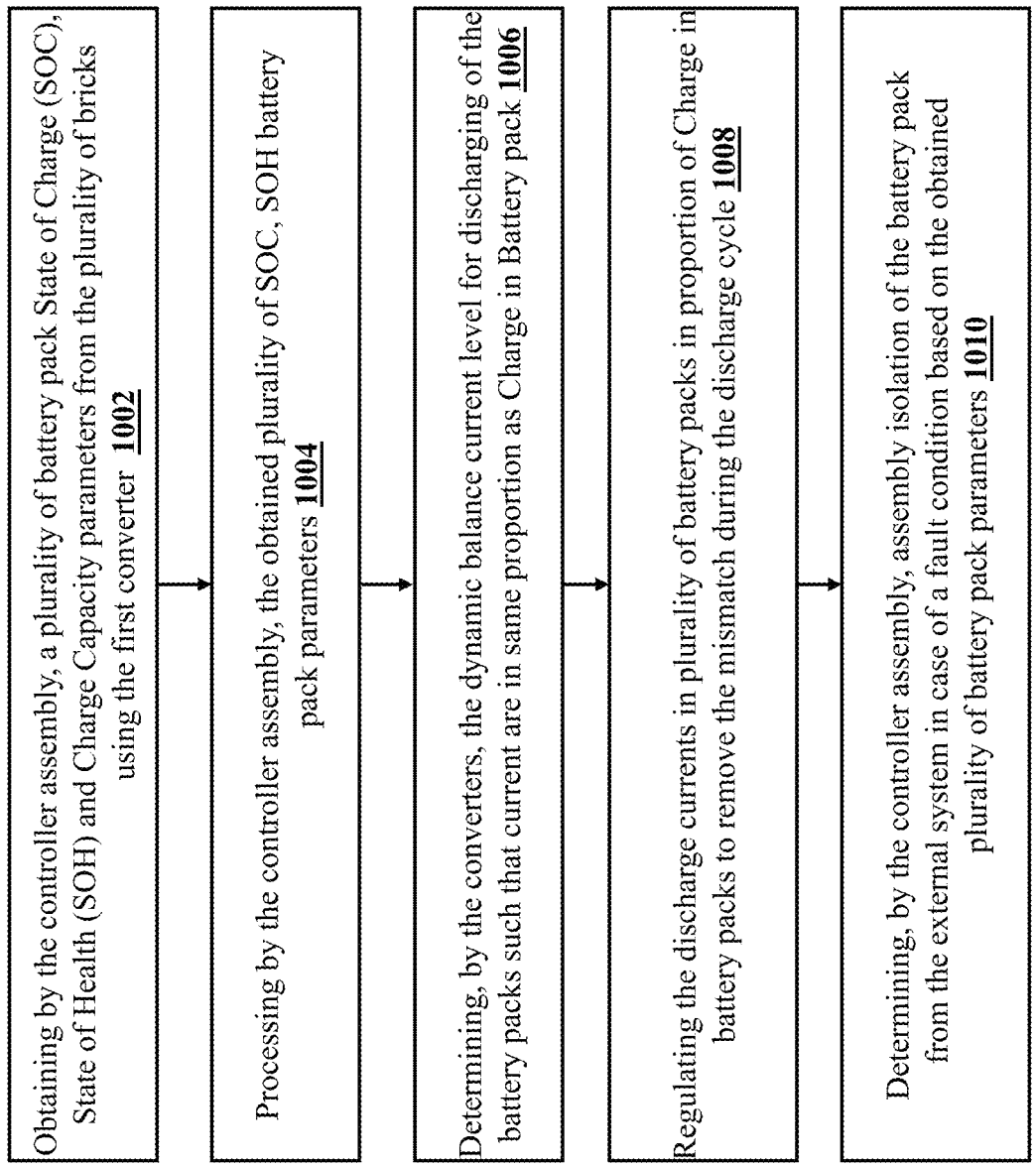
FIG. 10 is a flow diagram illustrating an example method for dynamically balancing power from distributed power sources in a battery pack during discharge, according to some embodiments herein.

FIG. 10 is a flow diagram illustrating an example method 1000 for dynamically balancing power from mismatched distributed power sources in a battery pack, during discharge according to an embodiment herein. The method herein dynamically balances power in the plurality of bricks of plurality of modules of a battery pack by regulating discharging current levels in the plurality of modules in the battery pack. The battery pack comprising a plurality of modules each with plurality of bricks and a controller assembly in each of the plurality of the modules. The controller assembly comprises a first converter adapted to be connected to the plurality of bricks and a second converter adapted to be connected to an external system. The method comprises, at step 1002, obtaining by the controller assembly, a plurality of battery pack parameters that are processed by the controller assembly, and measuring one or more of the brick battery parameters to determine the remaining charge in the brick (Ah) based on the calculation amount of remaining charge (Ah) in the plurality of the bricks in the plurality of modules. As a part of step 1002, the remaining charging capacity may be derived for the bricks. Additionally, a State of Charge (SOC) is given as % fraction of capacity of the module bricks already charged, a State of Health (SOH %) of the brick accounts for % loss in brick capacity due to use and age, and a remaining charge in the brick is then calculated as a product of % SOC, SOH and initial capacity. (charge in brick (Ah)=SOC %*SOH %*initial capacity (Ah)).

The charge in the plurality of the bricks is obtained from the measurements of the plurality of bricks for charging and discharging SOC, SOH of the batteries in the system.

At step 1004, the plurality of SOC, SOH and charge in the plurality of bricks are processed by the controller to calculate the mismatch in the charge available in each brick of the plurality of bricks, and at step 1006, a current level to regulate a discharging of the battery pack using the first converter is determined. This may comprise calculating the currents by looking at the balance of remaining charge in the bricks between the plurality of module bricks. The discharging current of each brick in the plurality of bricks is chosen in proportion to the remaining charge in the said brick. So battery pack 1 with charge in brick A discharges with current a, and battery pack 2 with charge in brick B discharges with current b, such that proportion of currents a and b is equal to the proportion of charges A and B, so that A:B::a:b.

Further, at step 1008, the controller assembly regulates the current in the plurality of bricks in proportion of the charge in the plurality of bricks to remove the mismatch during the discharge cycle. Further, at step 1010, the controller assembly determines isolation of the battery pack from the external system in case of a fault condition based on the obtained plurality of battery pack parameters.

Figure 11:
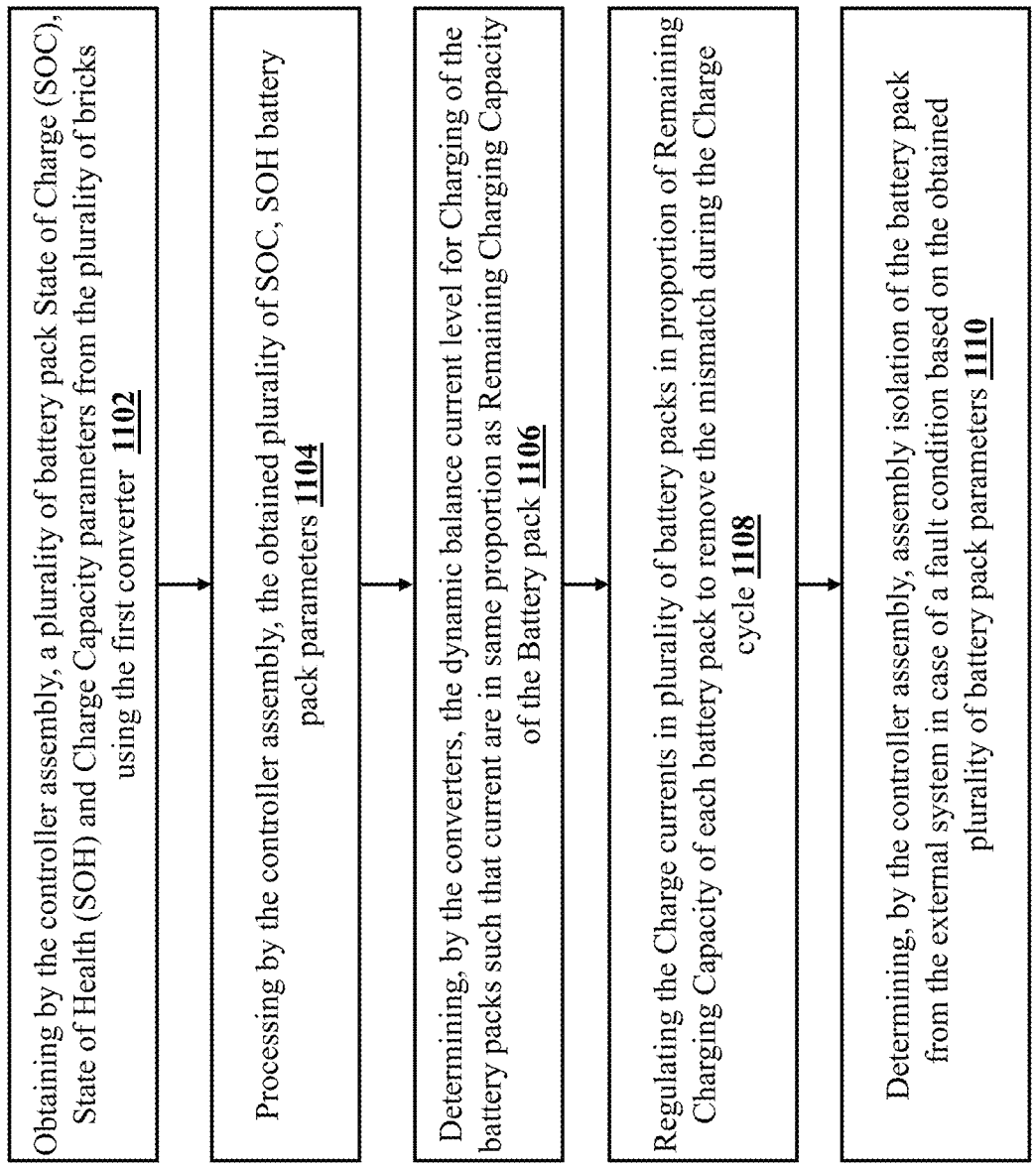
FIG. 11 is a flow diagram illustrating an example method for dynamically balancing power from distributed power sources in a battery pack during charge, according to some embodiments herein.

FIG. 11 is a flow diagram illustrating an example method 1100 for dynamically balancing power from mismatched distributed power sources in a battery pack, during charging according to an embodiment herein. The battery pack comprising a plurality of modules, each module with a plurality of bricks and a controller assembly. The method herein dynamically balances power in the plurality of modules of a battery pack by regulating charging current levels in the plurality of modules in the battery pack. The controller assembly comprises a first converter adapted to be connected to the plurality of bricks and a second converter adapted to be connected to an external system.

The method comprises, at step 1102, obtaining by the controller assembly, a plurality of battery pack parameters that are processed by the controller assembly, and further comprises measuring one or more of the brick battery parameters to determine a remaining charging capacity (Ah) of the brick based on the calculation amount of charging capacity (Ah) remaining in the plurality of the bricks in the plurality of modules. Step 1102 may comprise deriving the remaining charging capacity for the bricks. State of Charge (SOC) is given as % fraction of capacity of the module bricks already charged, State of Health (SOH %) of the brick accounts for % loss in brick capacity due to use and age, and the charge in the brick is then calculated as a product of %

SOC, SOH and initial capacity, as follows: charge in brick (Ah)=SOC %*SOH %*initial capacity (Ah). The charge in the plurality of bricks is obtained from the measurements of the plurality of bricks for charging and discharging SOC, SOH of the batteries in the system.

During charging the relevant measurement is the remaining charging capacity=(battery capacity−charge in brick)= (SOH %*initial brick capacity)*(100−SOC %), and at step 1104, the plurality of SOC, SOH and charge in the plurality of bricks are processed to compare, by the controller, to calculate the mismatch of remaining charging capacity available in each of the plurality of bricks. Next, at step 1106, a current level to regulate a discharging of the battery pack using the first converter is determined. This may comprise calculating the currents by looking at the balance of charge in bricks between the plurality of module bricks. The charging current of each of the plurality of bricks is chosen in proportion to the remaining charging capacity of the said battery brick.

In some embodiments, the method to control current during charging through the plurality of battery packs further comprises calculating currents by looking at the balance of remaining charging capacity in battery between the plurality of battery packs. The charging current of each of the plurality of battery packs is chosen in proportion to the remaining charging capacity of the said battery pack. So battery pack 1 with remaining charging capacity C charges with current c, and battery pack 2 with remaining charging capacity D discharges with current d, such that proportion of currents c and d is equal to the proportion of remaining charging capacity C and D, so that C:D::c:d. Continuing, at step 1108, the controller assembly regulates the current in the plurality of bricks in proportion of the remaining charging capacity in the plurality of bricks to remove the mismatch during the charging cycle, Further, at step 1110, the controller assembly determines isolation of the battery pack from the external system in case of a fault condition based on the obtained plurality of battery pack parameters.

The architecture of the battery management system (BMS) according to the embodiments herein provides for the important functional requirements. The BMS herein ensures that the cells are operating inside of manufacturer-recommended conditions. BMS also has to protect the rest of the system from damage by the battery in case of any cell failures. It prioritizes safe operations of cell and pack protection. The BMS further manage the rate of current during charging to maintain cells within manufacturer recommendations, especially for multi-cell battery chains, where cell balancing is required. The BMS herein further monitors and measures the battery pack currents, voltages, and temperatures.

The BMS is adapted to communicate with the onboard module controllers and power inverters and chargers, so that control parameters can be modified in case of any fault detection. The BMS is further adapted to perform data analysis to determine the make control decisions and usage constraints at battery pack level. BMS herein also manages battery pack balancing when multiple battery packs are connected in series or parallel configurations. Pack balancing is essential to account for mismatch between strong and weaker packs (given by their voltage) by equalizing the charge in the battery pack to extend battery life. The pack balancing is done when multiple packs are connected in series or parallel configurations. Pack balancing prevents over stressing of weaker battery packs on each charge/discharge cycle, in turn preventing premature failure of the battery. The BMS herein also performs history and data logging for each battery pack. Each battery pack is identified by its serial numbers for traceability starting from the manufacturing date onwards, and the BMS keeps track of the age of the battery both in terms of the calendar days and the number of charge/discharge cycles used up, keep a track on the battery pack life. The BMS also logs minimum and maximum voltage, temperature, and maximum charge and discharge currents and also any event where the battery pack went out of range of manufacturer-recommended operating conditions. The BMS herein also interact and control external components and system level interfaces to maintain cells within manufacturer recommended conditions using fans or heaters, also control of charger/inverter to delivery energy to the pack during charging or to the load during discharging, and control of components to isolate the battery pack in the event of a cell failure fuses and DC contactors.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

The invention claimed is:

1. A battery management system for dynamically balancing power in a battery module, the battery management system comprising:
   a plurality of modules, wherein each of the plurality of modules comprises a plurality of bricks, wherein each of the plurality of bricks comprises a plurality of blocks that are electrically connected in at least one of a series configuration or a parallel configuration; and
   a controller assembly provided in each of the plurality of modules, the controller assembly comprising a first converter adapted to be connected to the plurality of bricks and a second converter adapted to be connected to an external system; wherein the controller assembly is configured to obtain a plurality of battery pack parameters from the plurality of bricks using the first converter, process the obtained plurality of battery pack parameters and determine a current level to regulate a charging or discharging of the battery module using the second converter;
   wherein the controller assembly is adapted to operate in at least three discharge modes based on a battery pack voltage, where the at least three discharge modes comprise a boost discharge mode, a buck discharge mode and a bypass mode; and
   wherein the controller assembly operates in the boost discharge mode if the battery pack voltage is below a threshold load voltage.

2. The battery management system of claim 1, wherein the first converter and the second converter are configured to be connected in at least one of a series configuration or a parallel configuration.

3. The battery management system of claim 1, wherein the plurality of battery pack parameters comprises one or more of:

the battery pack voltage and current measurements obtained from the plurality of bricks, charging and discharging voltage and current measurements for the external system, a state of charge, a state of health, a charge in battery and a remaining charge capacity of the battery.

4. The battery management system of claim 1, wherein the controller assembly is adapted to:
   obtain the plurality of battery pack parameters from each brick of the plurality of bricks through an internal Controller Area Network (CAN) connected to the brick; and
   determine isolation of the battery pack from the external system in case of a fault condition based on the obtained plurality of battery pack parameters.

5. The battery management system of claim 1, wherein each module of the plurality of modules is adapted to communicate with other modules of the plurality of modules through an external CAN.

6. The battery management system of claim 1, wherein the first converter comprises a bi-directional full-bridge converter.

7. The battery management system of claim 1, wherein controller assembly is adapted to operate in the at least three discharge modes based on the battery pack voltage, where the at least three discharge modes comprise the boost discharge mode, the buck discharge mode and the bypass mode.

8. The battery management system of claim 1, wherein the controller assembly is adapted to operate in at least two charge modes based on the battery pack voltage, wherein the at least two charge mode comprises a buck constant current mode and a buck constant voltage mode.

9. The battery management system of claim 8, wherein the controller assembly is adapted to operate in the buck constant current mode if the battery pack voltage is less than a threshold voltage.

10. The battery management system of claim 8, wherein the controller assembly is adapted to operate in the buck constant voltage mode if the battery pack voltage exceeds a threshold voltage.

11. A battery management system for dynamically balancing power in a battery module, the battery management system comprising:
   a plurality of modules, wherein each of the plurality of modules comprises a plurality of bricks, wherein each of the plurality of bricks comprises a plurality of blocks that are electrically connected in at least one of a series configuration or a parallel configuration; and
   a controller assembly provided in each of the plurality of modules, the controller assembly comprising a first converter adapted to be connected to the plurality of bricks and a second converter adapted to be connected to an external system; wherein the controller assembly is configured to obtain a plurality of battery pack parameters from the plurality of bricks using the first converter, process the obtained plurality of battery pack parameters and determine a current level to regulate a charging or discharging of the battery module using the second converter;
   wherein the controller assembly is adapted to operate in at least three discharge modes based on a battery pack voltage, where the at least three discharge modes comprise a boost discharge mode, a buck discharge mode and a bypass mode; and
   wherein the controller assembly operates in the buck discharge mode if the battery pack voltage is above a threshold load voltage.

12. A battery management system for dynamically balancing power in a battery module, the battery management system comprising:
   a plurality of modules, wherein each of the plurality of modules comprises a plurality of bricks, wherein each of the plurality of bricks comprises a plurality of blocks that are electrically connected in at least one of a series configuration or a parallel configuration; and
   a controller assembly provided in each of the plurality of modules, the controller assembly comprising a first converter adapted to be connected to the plurality of bricks and a second converter adapted to be connected to an external system; wherein the controller assembly is configured to obtain a plurality of battery pack parameters from the plurality of bricks using the first converter, process the obtained plurality of battery pack parameters and determine a current level to regulate a charging or discharging of the battery module using the second converter;
   wherein the controller assembly is adapted to operate in at least three discharge modes based on a battery pack voltage, where the at least three discharge modes comprise a boost discharge mode, a buck discharge mode and a bypass mode; and
   wherein the controller assembly operates in the bypass mode if the battery pack voltage is equal to a threshold load voltage.

13. A method for dynamically balancing power in a battery pack by regulating discharging and charging voltage and current levels in modules of the battery pack,
   the battery pack comprising a plurality of modules, wherein each of the plurality of modules comprises a plurality of bricks, wherein each of the plurality of bricks comprises a plurality of blocks that are electrically connected in at least one of a series configuration or a parallel configuration, and wherein the method comprises:
   providing a controller assembly in each module of the plurality of modules, the controller assembly comprising a first converter adapted to be connected to the plurality of bricks and a second converter adapted to be connected to an external system; wherein the controller assembly is configured for:
   obtaining a plurality of battery pack parameters from the plurality of bricks using the first converter;
   processing the obtained plurality of battery pack parameters;
   determining a current level to regulate a charging or discharging of the said modules of the battery pack using the first converter; and
   operating the controller assembly in at least three discharge modes based on a battery pack voltage, where the at least three discharge modes comprises a boost discharge mode, a buck discharge mode and a bypass mode,
   wherein the method of operating the controller assembly in the at least three discharge modes comprises:
   checking whether or not the battery pack voltage is above a threshold load voltage;
   operating, the battery pack in the buck discharge mode, if the battery pack voltage is above the threshold load voltage;

operating the battery pack in the boost discharge mode if the battery pack voltage is below the threshold load voltage; and operating the battery pack in the bypass mode if the battery pack voltage is equal to the threshold load voltage.

14. The method of claim 13, wherein the first converter and the second converter are configured to be connected in at least one of a series configuration or a parallel configuration.

15. The method of claim 13, wherein the plurality of battery pack parameters comprises one or more of:

the battery pack voltage and current measurements obtained from the plurality of bricks, charging and discharging voltage and current measurements for the external system, a state of charge, a state of health, a charge in battery, and a remaining charge capacity of a battery.

16. The method of claim 13, further comprising:

obtaining, by the controller assembly, the plurality of battery pack parameters from each brick of the plurality of bricks through an internal Controller Area Network (CAN) connected to the brick; and determining isolation of the battery pack from the external system in case of a fault condition based on the obtained plurality of battery pack parameters.

17. The method of claim 13, wherein each module of the plurality of modules connected in a series configuration or a parallel configuration is adapted to communicate with one or more other modules through an external CAN.

18. The method of claim 13, wherein the first converter comprises a bi-directional full-bridge converter.

19. The method of claim 13, further comprising operating the controller assembly in at least two charge modes based on the battery pack voltage, wherein the at least two charge mode comprises a buck constant current mode and a buck constant voltage mode.

20. The method of claim 19, wherein the method of operating the controller assembly in the buck constant current mode comprises:

operating the controller assembly in the buck constant current mode if the battery pack voltage is less than a threshold voltage.

21. The method of claim 13, further comprising:

measuring a mismatch in a state of charge of the plurality of modules, and dynamically changing a balance of a plurality of currents to the modules during charging or discharging to remove the mismatch in the state of charge of the plurality of modules during a complete discharging and/or a complete charging cycle.

22. The method of claim 21, further comprising:

controlling the plurality of currents through the plurality of modules during discharging by calculating the plurality of currents from a balance of the state of charge in the plurality of modules, and choosing a discharge current for each module of the plurality of modules in proportion to a remaining charge of the modules.

23. The method of claim 21, further comprising:

controlling the plurality of currents through the plurality of battery bricks during charging based upon the balance of the state of charge in the plurality of modules, and choosing a charge current for the plurality of modules in proportion to a remaining charging capacity of the modules.

* * * * *